United States Patent
Day et al.

(10) Patent No.: US 8,086,610 B2
(45) Date of Patent: Dec. 27, 2011

(54) AUTONOMIC SELF CONFIGURING BUILDING-BLOCK DATABASE INDEX

(75) Inventors: Paul R. Day, Rochester, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 12/355,190

(22) Filed: Jan. 16, 2009

(65) Prior Publication Data

US 2010/0185639 A1    Jul. 22, 2010

(51) Int. Cl.
 *G06F 7/00* (2006.01)
(52) U.S. Cl. ........................................ 707/741
(58) Field of Classification Search ......... None
 See application file for complete search history.

(56) References Cited

U.S. PATENT DOCUMENTS

| | | | |
|---|---|---|---|
| 5,848,408 A * | 12/1998 | Jakobsson et al. | 707/714 |
| 6,105,018 A * | 8/2000 | Demers et al. | 1/1 |
| 6,980,976 B2 * | 12/2005 | Alpha et al. | 1/1 |

* cited by examiner

*Primary Examiner* — Tim T Vo
*Assistant Examiner* — Aaron Sanders
(74) *Attorney, Agent, or Firm* — Craig F. Taylor

(57) ABSTRACT

Methods, systems, and computer programs for executing a query having a first and second query value; in a database having at least two composite indexes, where the first index covers a first and second column and the second index covers the second column and a third column. Methods can include executing a query over the first and third columns, by using the first query values to probe the first index to obtain all related second column values, and using the obtained column values to probe the second index for all third column values which satisfy the second query value. A temporary composite index over the first and third columns for the query values can be created. A temporary composite index can be created for a query which was unexpected.

17 Claims, 5 Drawing Sheets

Query:
Select * from Table where C1 = 'a' and C3 = 'x'

| | T1 | |
|---|---|---|
| Col. C1 | Col. C2 | Col. C3 |
| a | 1 | x |
| a | 1 | y |
| a | 2 | x |
| a | 2 | y |
| b | 1 | x |
| b | 1 | y |
| b | 2 | x |
| b | 2 | y |

Gluing indexes X1 and X2 together – here the
C2 values from X1 index are used to probe X2 index FIG. 5 – Table T1 with Indexes X1 over (C1,C2) and X2 over (C2,C3)

Query:
Select * from Table where C1 = 'a' and C3 = 'x'

FIG. 6 – Gluing indexes X1 and X2 together – here the C2 values from X1 index are used to probe X2 index

AUTONOMIC SELF CONFIGURING BUILDING-BLOCK DATABASE INDEX

BACKGROUND

1. Technical Field

The field of the invention is data processing, or, more specifically, methods, apparatus, and products for monitoring and managing database queries for improving performance.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Information stored on a computer system is often organized in a structure called a database. A database is a grouping of related structures called 'tables,' which in turn are organized in rows of individual data elements. The rows are often referred to as 'records,' and the individual data elements are referred to as 'fields.' In this specification generally, therefore, an aggregation of fields is referred to as a 'data structure' or a 'record,' and an aggregation of records is referred to as a 'table.' An aggregation of related tables is called a 'database.'

A computer system typically operates according to computer program instructions in computer programs. A computer program that supports access to information in a database is typically called a database management system or a 'DBMS.' A DBMS is responsible for helping other computer programs access, manipulate, and save information in a database.

A DBMS typically supports access and management tools to aid users, developers, and other programs in accessing information in a database. One such tool is the structured query language, 'SQL.' SQL is query language for requesting information from a database. Although there is a standard of the American National Standards Institute ('ANSI') for SQL, as a practical matter, most versions of SQL tend to include many extensions. Here is an example of a database query expressed in SQL:

select*from stores, transactions
 where stores.location="Minnesota"
 and stores.storeID=transactions.storeID This SQL query accesses information in a database by selecting records from two tables of the database, one table named 'stores' and another table named 'transactions.' The records selected are those having value "Minnesota" in their store location fields and transactions for the stores in Minnesota. In retrieving the data for this SQL query, an SQL engine will first retrieve records from the stores table and then retrieve records from the transaction table. Records that satisfy the query requirements then are merged in a 'join.'

Database indexes are used to speed up queries. However, users frequently lack the skill to build appropriate indexes, and/or there are too many disparate queries for optimal indexes to be built for all permutations of columns. While there are tools to recommend optimal indexes, those are only known after the fact in many environments where ad hoc queries are put together.

In one example, a database may have a first index on a first column $c_1$ and a second column $c_2$. The first index allows rapid indexing for queries including columns $c_1$ and $c_2$, typically providing an entry into the database table, for example, a record number. Such an index, often called a composite index, is often implemented as a tree, having in this example a node which could branch to only certain values of $c_1$, followed by further nodes and branches to finally select a desired value of $c_1$, followed by nodes and branches which select a desired value of $c_2$ which also has the desired value of $c_1$.

In this same example, a database may also have a second index on a second column $c_2$ and a third column $c_3$. The second index allows rapid indexing for queries including columns $c_2$ and $c_3$, typically providing an entry into the database table, for example, a record number. In this example a node which could branch to only certain values of $c_2$, followed by further nodes and branches to finally select a desired value of $c_2$, followed by nodes and branches which select a desired value of $c_3$ which also has the desired value of $c_2$.

If a query on $c_1$ and $c_3$ is made, there is no index on $c_1$ and $c_3$, making the query execute more slowly. It would be advantageous to have an index over $c_1$ and $c_3$ at the time of the query, but none was previously created and may not be worth creating. In particular, for ad hoc queries, such queries may be unexpected and/or too infrequent to predict.

Thus there remains a demand for an optimizer to run a query quickly even when only suboptimal indexes exist. One method of piecing together information from multiple indexes is bitmapping—however that has serious shortcomings including the startup time to build bitmaps and the fact that bitmaps once built can become stale if the underlying data changes.

SUMMARY

Some embodiments of the present invention provide methods, systems, and computer programs for executing a query having a first and second query value; in a database having at least two composite indexes, where the first index covers a first and second column and the second index covers the second column and a third column. Methods can include executing a query over the first and third columns, by using the first query values to probe the first index to obtain all related second column values, and using the obtained column values to probe the second index for all third column values which satisfy the second query value. A temporary composite index over the first and third columns over the query values can be created by utilizing and effectively "gluing" the first and second indexes together. A temporary composite index can be created for a query which was not anticipated and did not have a preferred index previously built for the columns in the query.

One embodiment includes a method for executing a query in a database (DB) having a first composite index having a first column and a second column, and having a second composite index having the second column and a third column. The query can include a selection for a first query value for the first column and a second query value for the third column. One method includes utilizing the first index to find every instance in the first index for which the first column satisfies the first query value and finding all corresponding second column values in the first index. The method may further include utilizing the found second column values to find every instance in the second index for which the third column satisfies the second query value.

Some methods further include building a third index having columns corresponding at least to the first and third columns and rows for every record in the first index for which the first column has a value satisfying the first query value. In some embodiments the third index is temporary. Building the third index may further include adding locations of corresponding records in the DB, for example, record numbers or relative record numbers.

In some embodiment methods, column two is a relative record number of each row in the table, and column two is a trailing column of a first index and a leading column of a second index. As a trailing key it may be an internal key of the index and not visible to the end user.

In some embodiments, utilizing the first index to find every instance in the first index for which the first column satisfies the first query value and finding all corresponding second column values in the first index is distributed to more than one process. In some embodiments, utilizing the found second value to find every instance in the second index for which the third column satisfies the second query value is distributed to more than one process and/or CPU. In some embodiments, both of the methods described in this paragraph are distributed to more than one process and/or CPU.

Some embodiment methods also include providing the found instances in the first index and the found instances in the second index to a DB statistics engine. In various methods, records in the DB corresponding to the instances in the first and second indexes either are or are not retrieved. Methods may also include retrieving records in the DB corresponding to the instances found in the first and second indexes for which the first column satisfies the first query value and for which the third column satisfies the second query value. Querying the first and second indexes is completed before retrieving any corresponding records in the DB in some embodiments but not in other embodiments.

Some embodiments of the invention also include a system for processing database queries, the apparatus comprising a computer processor, a computer memory operatively coupled to the computer processor. The computer memory can have disposed within it computer program instructions capable of executing any of the methods described herein.

Computer program products for processing database queries are also provided by some embodiments of the invention. The computer program product can be disposed in a computer readable signal bearing medium, with the computer program product including computer program instructions capable of executing any of the methods described herein.

DETAILED DESCRIPTION

Figure 1:
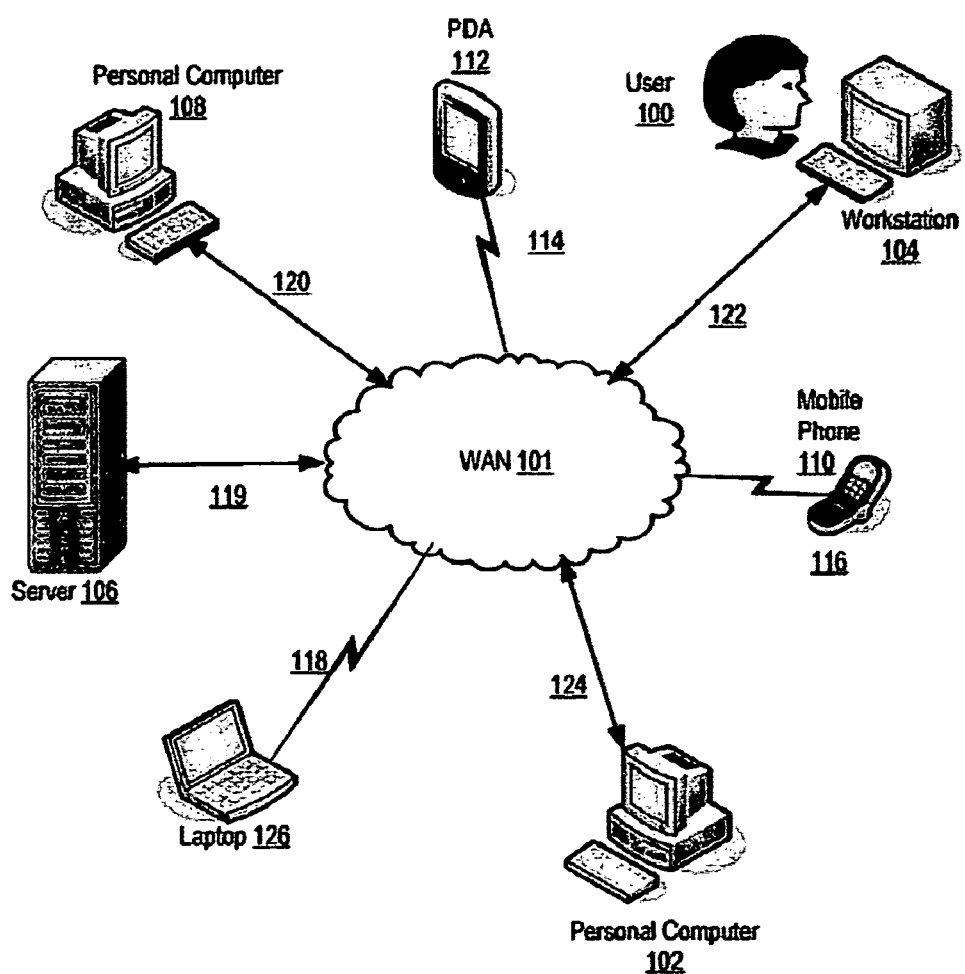
FIG. 1 is a network diagram of a system for processing database queries according to embodiments of the present invention.

FIG. 1 depicts an exemplary data processing system capable of processing database queries for performance processing according to embodiments of the present invention. The system of FIG. 1 includes a number of computers connected for data communications in networks. Each of the computers of the system of FIG. 1 may have installed upon it a database management system capable of processing database queries in accordance with the present invention. The data processing system of FIG. 1 includes wide area network ("WAN") 101. The network connection aspect of the architecture of FIG. 1 is only for explanation, not for limitation. In fact, systems for processing database queries according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, several exemplary devices including a PDA 112, a computer workstation 104, a mobile phone 110, personal computer 102, a laptop 126, a server 106, and another personal computer 108 are connected to WAN 101. The network-enabled mobile phone 110 connects to WAN 101 through wireless link 116, the PDA 112 connects to network 101 through wireless link 114 and the laptop 126 connects to the network 101 through a wireless link 118. In the example of FIG. 1, the personal computer 108 connects through a wireline connection 120 to WAN 101, the computer workstation 104 connects through a wireline connection 122 to WAN 101, the personal computer 108 connects through a wireline connection 124 to WAN 101, and the server 106 connects through a wireline connection 119 to WAN 101. In the system of FIG. 1, exemplary devices 120, 112, 104, 106, 110, 126, and 102 support a database management system capable of processing database queries and interacting with a user 100.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1

Figure 2:
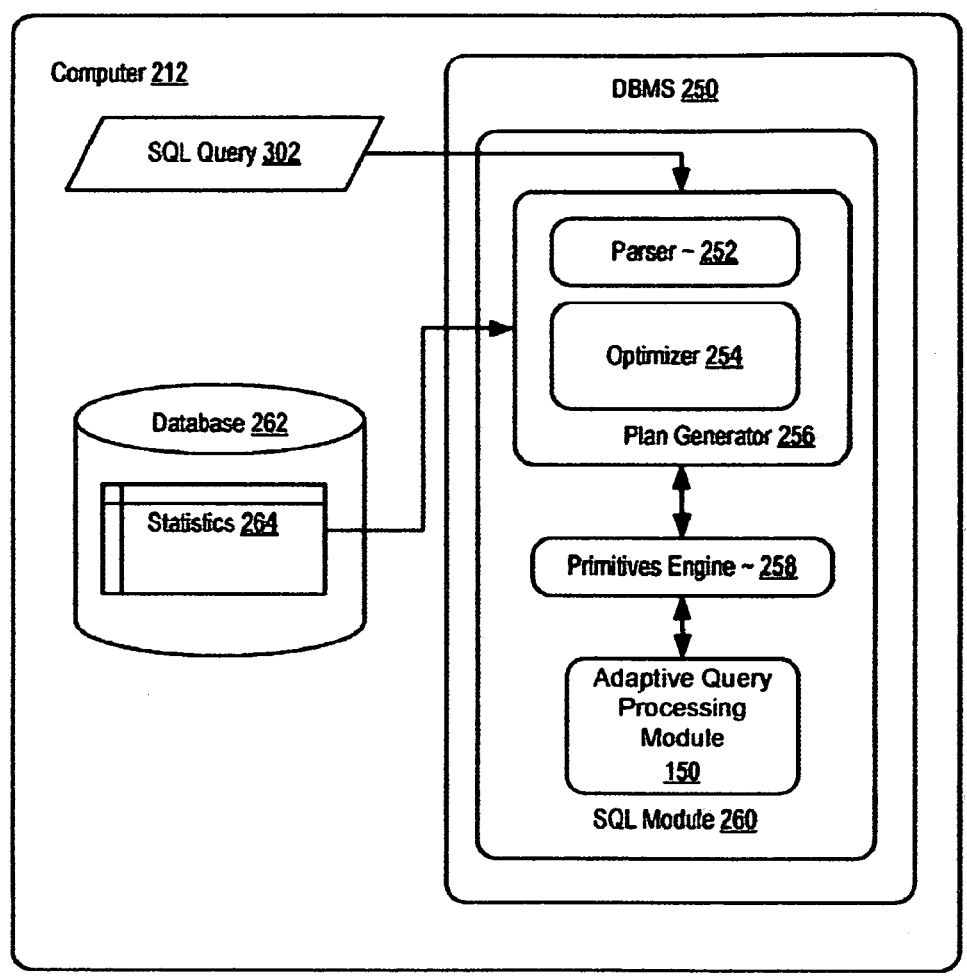
FIG. 2 is a block diagram of an exemplary system for processing database queries in accordance with the present invention according to embodiments of the present invention.

FIG. 2 is a block diagram of an exemplary system for processing database queries in accordance with the present invention according to embodiments of the present invention. The system of FIG. 2 includes a computer 212 having installed upon it a database management system ('DBMS') 250. DBMS 250 administers access to the contents of the database 262. The DBMS 250 includes an SQL module 260. The SQL module is implemented as computer program instructions that execute a SQL query 302.

The exemplary SQL module 260 of FIG. 2 also includes an exemplary plan generator 256. Each SQL query is carried out by a sequence of database operations specified as a plan. The plan generator of FIG. 2 is implemented as computer program instructions that create a plan for a SQL query. A plan is a description of database functions for execution of an SQL query. Taking the following SQL query as an example:

select*from stores, transactions
    where stores.storeID=transactions.storeID, plan generator 256 may generate the following exemplary plan for this SQL query:

tablescan stores
    join to
    index access of transactions

This plan represents database functions to scan through the stores table and, for each stores record, join all transactions records for the store. The transactions for a store are identified through the storeID field acting as a foreign key. The fact that a selection of transactions records is carried out for each store record in the stores table identifies the join function as iterative.

The exemplary plan generator 256 of FIG. 2 includes a parser 252 for parsing the SQL query. Parser 252 is implemented as computer program instructions that parse the SQL query. A SQL query is presented to SQL module 260 in text form, the parameters of an SQL command. Parser 252 retrieves the elements of the SQL query from the text form of the query and places them in a data structure more useful for data processing of an SQL query by an SQL module.

The exemplary plan generator 256 also includes an optimizer 254 implemented as computer program instructions that optimize the plan in dependence upon database management statistics 264. Optimizer 254 optimizes the execution of SQL queries against DBMS 250. Optimizer 254 is implemented as computer program instructions that optimize execution of a SQL query in dependence upon database management statistics 264. Database statistics are typically implemented as metadata of a table, such as, for example, metadata of tables of database 262 or metadata of database indexes. Database statistics may include, for example:

- histogram statistics: a histogram range and a count of values in the range,
- frequency statistics: a frequency of occurrence of a value in a column, and
- Cardinality statistics: a count of the number of different values in a column.

These three database statistics are presented for explanation only, not for limitation.

The exemplary SQL module 260 of FIG. 2 also includes a primitives engine 258 implemented as computer program instructions that execute primitive query functions in dependence upon the plan. A 'primitive query function,' or simply a 'primitive,' is a software function that carries out actual operations on a database, retrieving records from tables, inserting records into tables, deleting records from tables, updating records in tables, and so on. Primitives correspond to parts of a plan and are identified in the plan. Examples of primitives include the following database instructions:

- retrieve the next three records from the stores table into hash table H1
- retrieve one record from the transactions table into hash table H2
- join the results of the previous two operations
- store the result of the join in table T1

The SQL module 260 of FIG. 2 also includes an optional adaptive query processing module 150, not provided in all DBMS. The adaptive query processing module 150 of FIG. 2 is capable of processing database queries according to the present invention. The adaptive query processing module 150 includes computer program instructions capable of identifying poorly performing queries; substituting an alternate plan to execute the query; and executing the query using the alternate plan.

Figure 3:
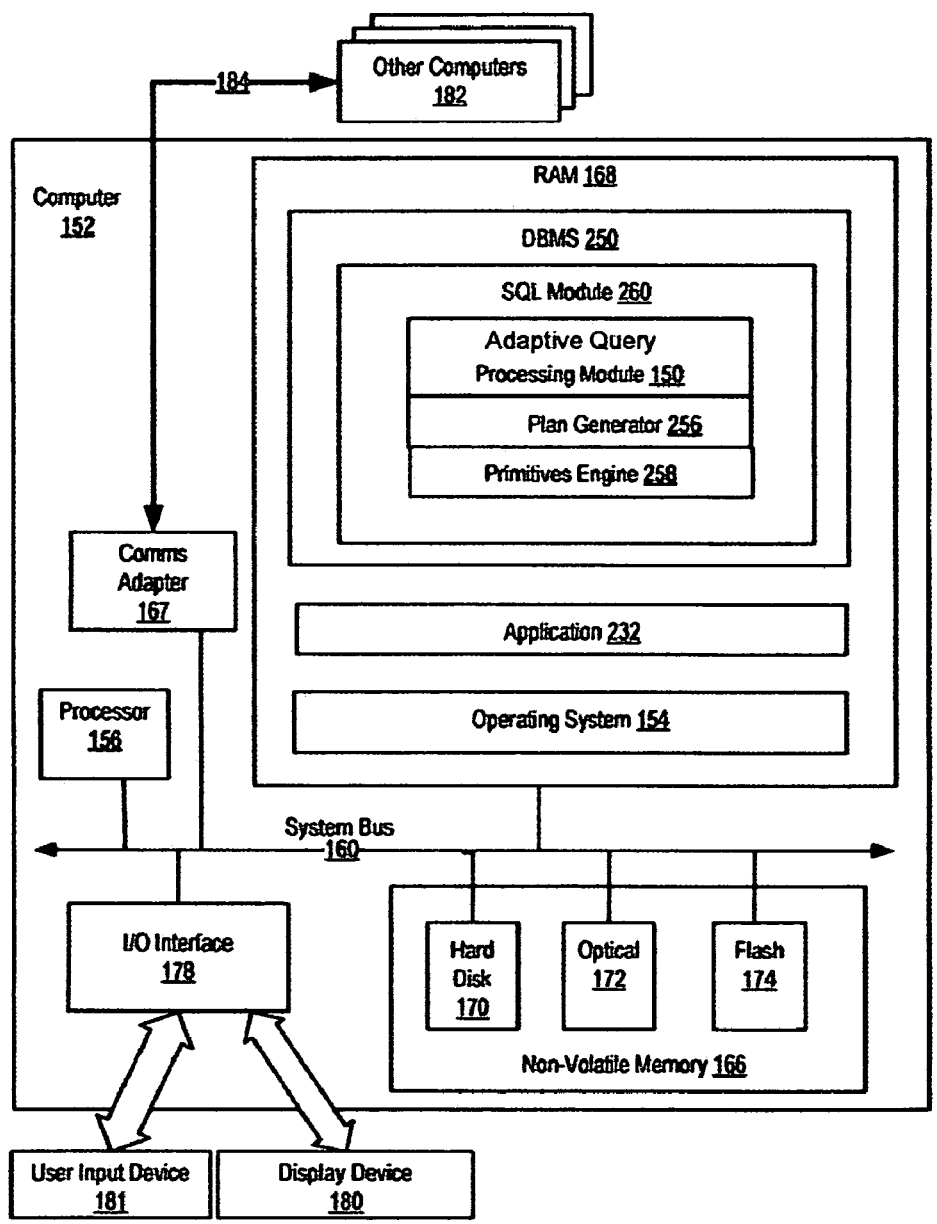
FIG. 3 is a block diagram of automated computing machinery comprising a computer useful in processing database queries in accordance with the present invention.

FIG. 3 is a block diagram of automated computing machinery comprising a computer 152 useful in processing database queries in accordance with the present invention according to embodiments of the present invention. The computer 152 of FIG. 3 includes at least one computer processor 156 or 'CPU' as well as random access memory 168 ("RAM"). Stored in RAM 168 is database management system 250. The database management system 250 of FIG. 3 includes an SQL module 260, which in turn includes a plan generator 256 and a primitives engine 258.

The SQL module 260 of FIG. 3 also includes an adaptive query processing module 150. The adaptive query processing module 150 was described with respect to FIG. 2. Also stored in RAM 168 is an application 232, a computer program that uses the DBMS 250 to access data stored in a database. Also stored in RAM 168 is an operating system 154. Operating systems useful in computers according to embodiments of the present invention include Unix, Linux, Microsoft NT™, i50S, and many others as will occur to those of skill in the art. Operating system 154, DBMS 250, and application 154 in the example of FIG. 3 are shown in RAM 168, but many components of such software typically are stored in non-volatile memory 166 also.

The computer 152 of FIG. 3 includes non-volatile computer memory 166 coupled through a system bus 160 to processor 156 and to other components of the computer. Non-volatile computer memory 166 may be implemented as a hard disk drive 170, optical disk drive 172, electrically erasable programmable read-only memory space (so-called 'EEPROM' or 'Flash' memory) 174, RAM drives (not shown), or as any other kind of computer memory as will occur to those of skill in the art.

The exemplary computer 152 of FIG. 3 includes a communications adapter 167 for implementing connections for data communications 184, including connections through networks, to other computers 182, including servers, clients, and others as will occur to those of skill in the art. Communications adapters implement the hardware level of connections for data communications through which local devices and remote devices or servers send data communications directly to one another and through networks. Examples of communications adapters useful according to embodiments of the present invention include modems for wired dial-up connections, Ethernet (IEEE 802.3) adapters for wired LAN connections, and 802.11b adapters for wireless LAN connections.

The example computer of FIG. 3 includes one or more input/output interface adapters 178. Input/output interface adapters in computers implement user-oriented input/output through, for example, software drivers and computer hardware for controlling output to display devices 180 such as computer display screens, as well as user input from user input devices 181 such as keyboards and mice.

Figure 4:
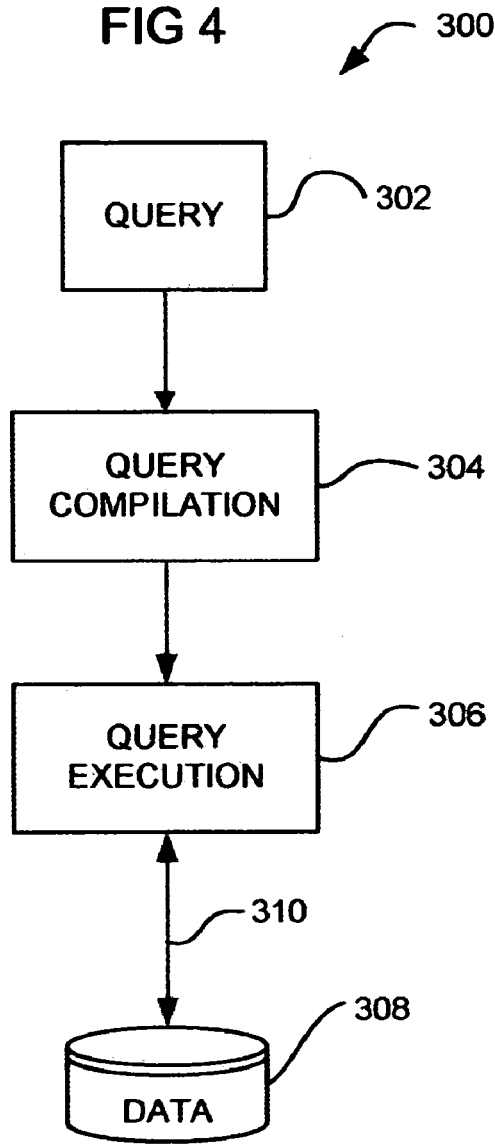
FIG. 4 is a high level flow chart of a method according some embodiments of the present invention.

FIG. 4 illustrates a method 300 for processing an SQL query. A query 302, for example an SQL query, is received. The query can be generated as indicated at 304, and the query plan executed at 306. Query plan execution 306 can both write data to data store 308 and read data from data store 308, as indicated at 310.

Figure 5:
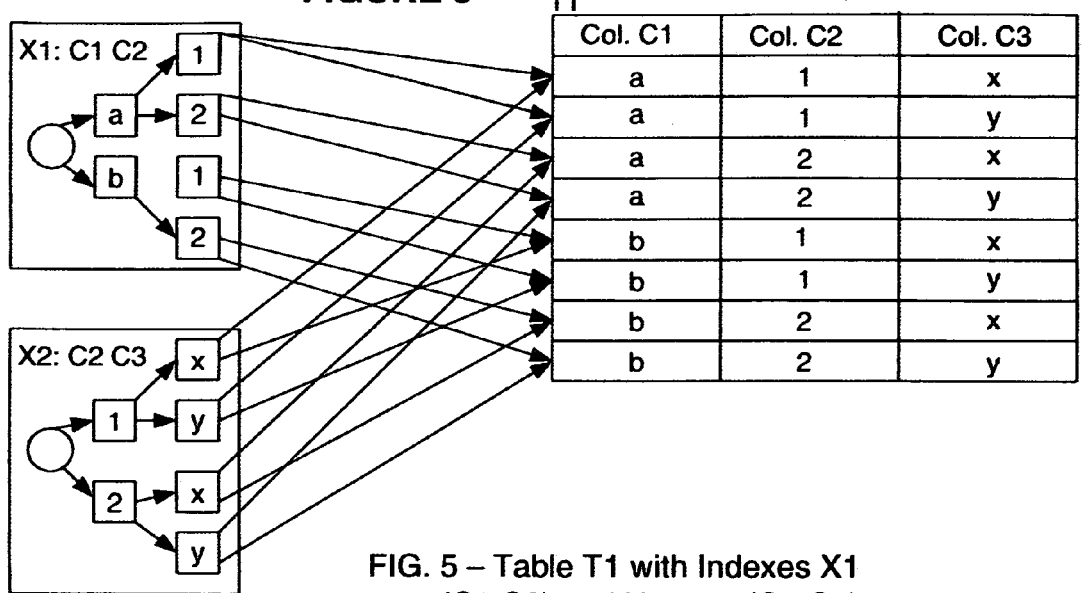
FIG. 5 is a schematic diagram of a database having a first index X1 over columns c1 and c2, and a second index X2 over columns c2 and c3, both providing quick access into a database table T1.

FIG. 5 illustrates how queries selecting from table T1 would work, where c1 equals a desired value and c2 equals a desired value, or where c2 equals a desired query value and c3 equals a desired query value.

FIG. 5 illustrates how queries selecting from table T1 would work, where c1 equals a desired value and c2 equals a desired value, or where c2 equals a desired query value and c3 equals a desired query value. FIG. 5 illustrates a first composite index X1 over two columns c1 and c2. In the illustrated example, c1 can have the values a and b. Column c2 can have the values 1 and 2. There is also a second composite index X2 over columns c2 and c3. Column c2 can have the values 1 and 2 and column c3 can have the values x and y. In this example, the composite indexes are implemented as a tree, for example, a binary tree. When the query for a desired c1 and c3 is executed, the result is 0, 1, or more records in table T1. The records can be identified by relative record numbers in some embodiments. When the query for a desired c2 and c3 is executed, the result is 0, 1, or more records in table T1. The records can be identified by relative record numbers in some embodiments. There may be several records satisfying a particular query for c1 and c2 or c2 and c3.

Figure 6:
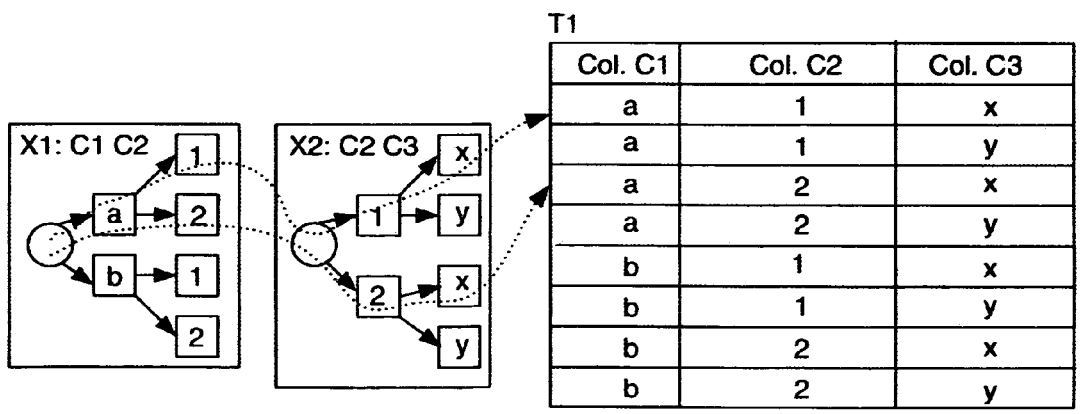
FIG. 6 is a schematic diagram of a method for using the database of FIG. 5 by using the first index X1 to probe into the second index X2 to effectively partially join X1 and X2 to form a partial third index over c1 and c3.

FIG. 6 illustrates another query:
Select * from Table where c1='a' and c3='x'.

In this example, there is no index over c1 and c3. In this aspect of the invention, the indexes X1 and X2 are effectively glued together, where the c2 values from the X1 index are used to probe the X2 index. Thus, we need to run a probe on C1='a' and c3='x'. No appropriate c1, c3 index exists. However, a c1, c2 index exists and a c2, c3 index exists. We can use the building block index technique to utilize the two indexes together. Then using transitive closure, we create a makeshift c1, c3 index. This index can be created by probing X1 for c1="a" and grabbing all the values under c2, which include the c2 values equal to 1 and 2 in this example.

Given the obtained c2 index values (having c1="a"), these c2 values can be used to probe the index X2 over c2, c3. In this example, this would produce records having (c2, c3) values of (1, x), (1, y), (2, x) and (2, y). Note that only two of these also satisfy the original query requirement that c3="x", so the result of the initial query is the set of the two records in the Table T1 pointed to in FIG. 6.

In some embodiments, the implementation does one of the following: (1) verifies that the second index is unique with the keys probed; (2) re-applies the entire selection to the table; or (3) applies the relative record number (RRN) of the values selected from the first index to the second index as selection, where the RRN is an implicit key at the end of every index. Applicant believes that these three implementation details are easy to implement and that any one of them guarantees that the correct rows are returned from the building block index.

In some embodiments, the records from the table need not be retrieved, if only statistical values are desired, or if the record numbers in the table are immediately required. In one such method, statistical estimates are gathered for a query optimizer or statistics engine to help in query optimizations. In the above example, an estimate of how many rows match the criteria c1="a" and c3="x" can be easily obtained, without even accessing the table itself.

Some methods can be used to support Index Only Access (IOA). IOA is a technique in which all the columns are grabbed from an index and therefore there is no need to touch the table, avoiding 10. In one such example, the query is:
Select count (*) from Table T1 where c1="a" and c3="x"

In another embodiment method, aspects of some embodiments of the invention are used to support an interactive FIRSTIO environment. A FIRSTIO environment is one where the query optimizer is directed to fill one screen of data as fast as possible (versus returning the entire result set as fast as possible) for an interactive user. If you have an ordering or grouping on the query, previous methods may look for an index which matches the ordering. For example, if looking for an index and one was not found exactly, the index data could be put into a buffer and sorted. While this technique supports FIRSTIO with almost any query, it is especially important with GROUP BY or ORDER BY queries such as:
Select c1, c3, count (*) from table T1 group by c1, c3

To implement the above query, the invention can grab a value from the first index—the value is known to be the min (or max) value due to how indexes are built. Then from the second index it gathers all the "child values" which it can easily group or sort, then presents those rows to the user. Then the optimizer can grab the second value from the first index, and sort the child values from the second index, and return them to the user, and so on, until there are enough values to fill the user's screen. This technique may be much faster to get the initial rows on the screen if there are millions of rows in the result set. Previous methods known to applicants would have had to scan the whole table (or do random access on the table from a suboptimal index) if there was not an appropriate index to use to group/sort the rows.

In another aspect, a live view of the data through the building block indexes can be provided. In one example, if a user hits "refresh" on their screen the building block indexes can easily reflect the current state of the data in the various indexes in the building block configuration (versus bitmaps or hashtable query implementations where the data on the screen goes stale).

In yet another aspect, parallel probes can be used. In one example, if more than one value is taken from the first index probe; those values can be applied to the second index in parallel probes (for example running on different CPUs or in different tasks).

Exemplary embodiments of the present invention are described largely in the context of SQL. This is for ease of explanation and not for limitation. Optimizing database queries is not limited to SQL. In fact, other query languages exist such as XML, QRY/400, Open Query File ('OPNQUERYF'), DLL and the database queries may include queries of all such query languages and many others as will occur to those of skill in the art.

Exemplary embodiments of the present invention are described largely in the context of a fully functional computer system for processing database queries. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

The invention claimed is:

1. A method for executing a query in a database (DB) having a first composite index having a first column and a second column, and having a second composite index having the second column and a third column, the query including a selection for a first query value for the first column and a second query value for the third column, the method comprising:
   utilizing the first index to find every instance in the first index for which the first column satisfies the first query value and finding all corresponding second column values in the first index;
   utilizing the found second column values to find every instance in the second index for which the third column satisfies the second query value; and
   building a third index having columns corresponding at least to the first and third columns and rows for every record in the first index for which the first column has a value satisfying the first query value.

2. The method of claim 1, in which building the third index includes building the third index as a temporary index.

3. The method of claim 1, in which building the third index includes adding locations of corresponding records in the DB.

4. The method of claim 1, in which utilizing the first index to find every instance in the first index for which the first column satisfies the first query value and finding all corresponding second column values in the first index is distributed to more than one process.

5. The method of claim 1, in which utilizing the first index to find every instance in the first index for which the first column satisfies the first query value and finding all corresponding second column values in the first index is distributed to more than one CPU.

6. The method of claim 1, in which utilizing the first index to find every instance in the first index for which the first column satisfies the first query value and finding all corresponding second column values in the first index is distributed to more than one process; and
   in which utilizing the found second column values to find every instance in the second index for which the third column satisfies the second query value is distributed to more than one process.

7. The method of claim 1, further comprising providing the found instances in the first index and the found instances in the second index to a DB statistics engine.

8. The method of claim 1, wherein records in the DB corresponding to the instances in the first and second indexes are not retrieved.

9. The method of claim 1, further comprising retrieving records in the DB corresponding to the instances found in the first and second indexes for which the first column satisfies the first query value and for which the third column satisfies the second query value.

10. The method of claim 9, in which the finding of all corresponding second column values is not completed prior to beginning the finding of every instance in the second index for which the third column satisfies the second query value.

11. The method of claim 9, further comprising displaying at least some of the corresponding DB records prior to retrieving all of the corresponding DB records.

12. A system for processing database queries, the system comprising a computer processor, a computer memory operatively coupled to the computer processor, the computer memory having disposed within it computer program instructions capable of:
   executing a query in a database (DB) having a first composite index having a first column and a second column, and having a second composite index having the second column and a third column, the query including a selection for a first query value for the first column and a second query value for the third column;
   utilizing the first index to find every instance in the first index for which the first column satisfies the first query value and finding all corresponding second column values in the first index;
   utilizing the found second column values to find every instance in the second index for which the third column satisfies the second query value; and
   building a third index having columns corresponding at least to the first and third columns and rows for every record in the first index for which the first column has a value satisfying the first query value.

13. The system for processing database queries of claim 12, further comprising computer program instructions in which building the third index includes adding locations of corresponding records in the DB.

14. The system for processing database queries of claim 12, further comprising computer program instructions wherein records in the DB corresponding to the instances in the first and second indexes are not retrieved.

15. A computer program product for processing database queries, the computer program product disposed in a tangible computer readable signal bearing medium, the computer program product comprising computer program instructions capable of:

executing a query in a database (DB) having a first composite index having a first column and a second column, and having a second composite index having the second column and a third column, the query including a selection for a first query value for the first column and a second query value for the third column;

utilizing the first index to find every instance in the first index for which the first column satisfies the first query value and finding all corresponding second column values in the first index;

utilizing the found second column values to find every instance in the second index for which the third column satisfies the second query value;

building a third index having columns corresponding at least to the first and third columns and rows for every record in the first index for which the first column has a value satisfying the first query value.

16. The computer program product of claim 15, further comprising computer program instructions in which building the third index includes adding locations of corresponding records in the DB.

17. The computer program product of claim 15, further comprising computer program instructions for retrieving records in the DB corresponding to the instances found in the first and second indexes for which the first column satisfies the first query value and for which the third column satisfies the second query value; and computer program instructions for displaying at least some of the corresponding DB records prior to retrieving all of the corresponding DB records.

\* \* \* \* \*